United States Patent Office 2,844,570
Patented July 22, 1958

2,844,570

PRODUCTION OF HIGHLY HYDROXYALKYLATED POLYVINYL ALCOHOLS

Aubrey Ernest Broderick, South Charleston, W. Va., assignor to Union Carbide Corporation, a corporation of New York No Drawing. Application November 17, 1953
Serial No. 392,769

3 Claims. (Cl. 260—91.3)

This invention relates to the production of hydroxyalkylated polyvinyl alcohols; and more especially it concerns certain novel highly hydroxyalkylated medium and high molecular polyvinyl alcohols which are soluble in certain organic solvents, and to a novel method for their production.

The invention has especial utility for making resinous hydroxyalkylated polyvinyl alcohols that are soluble in many common solvents for various vinyl resins and other synethetic resins, and readily can be incorporated into solutions of the resins in such solvents to provide compositions useful as coating and impregnating compositions, and for making cast articles.

Water-soluble hydroxyethyl ethers of polyvinyl alcohols already have been made by reacting a polyvinyl alcohol with ethylene oxide in the weight ratios of from 1:1 to 1:2, at temperatures around 50° to 100° C.; and usually in the presence of a tertiary organic base or of a caustic alkali. Aqueous solutions of these ethers have some merit as aqueous sizing compositions. The products, however, lack solubility in organic solvents, and particularly in commercially practicable solvents, such as, acetone, acetonitrile, dioxane, and various other organic compounds that are solvents for various synthetic resins, hence their usefulness is strictly limited to uses where solubility of the product in organic solvents is not required.

Among the more important objects of the invention are the following: The producton of novel highly hydroxy-alkylated polyvinyl alcohols that are soluble in acetone, acetonitrile, and certain other organic solvents; the production of such products by the reaction of a polyvinyl alcohol, or an at least 98% hydrolyzed polyvinyl ester of a lower alkanoic acid, with an alkylene oxide in the presence of a reaction medium which is a solvent for the hydroxyalkylated polyvinyl alcohol product, thus allowing the hydroxyalkylation to be continued to the required degree without the permanent formation of a gel-like mass that otherwise occurs and prevents further uniform hydroxyalkylation necessary for the production of organic solvent soluble products. These and other objects will be evident from the following description:

According to this invention, polyvinyl alcohol, or an at least 98% hydrolyzed polyvinyl ester of a lower alkanoic acid such as polyvinyl acetate or propionate, is reacted with an alkylene oxide such as ethylene oxide or propylene oxide, or a mixture thereof, in the weight ratio of from about 4 to 20 or more parts of the alkylene oxide per part of the polyvinyl alcohol, while dispersed or dissolved in a liquid such as dioxane, water, the secondary and tertiary alcohols having 3 to 5 carbon atoms, such as isopropanol, pentanol-3-methoxyisopropanol mixtures, tert-butanol, and mixtures thereof, which liquid, alone or in conjunction with water present, becomes a solvent for the hydroxyalkylated product as it is formed.

The reaction is conducted at temperatures within the range between about 10° C. and about 50° C., and under atmospheric or low superatmospheric pressures, desirably in the presence of an inert gas such as nitrogen. Preferably, temperatures between 10° C. and 35° C. are used when ethylene oxide is the hydroxyalkylating agent, and between 10° C. and 50° C. when propylene oxide is used. The hydroxyalkylation is carried out in the presence of certain alkaline condensation catalysts, such as the alkali metals; and the alkali metal hydroxides and alcoholates, such as caustic alkalies and sodium methylate. The reaction can be carried out either in the presence or absence of water. For best results when the alkali metals or the alkali metal alcoholates are used the reaction mixture should be substantially dry and alcoholic solvents should not be used. The use of alkali metal alcoholates as catalysts in conjunction with dioxane as solvent gives excellent products at a slower reaction rate. The organic solvent soluble reaction products of the invention are generally viscous liquids which are recovered by neutralization of the catalyst, followed by distillation of the dispersing liquid, after removal therefrom of the salt formed during the neutralization step. These organic solvent soluble hydroxyalkyl polyvinyl alcohols usually have average molecular weights such that the specific viscosity of a 0.2% solution thereof in water at 20° C. is within the range from about 0.02 to about 0.25.

It is generally preferred, in the interest of improving the quality of the hydroxyalkylated product and the practicability of the procedures, to use as starting material a polyvinyl ester of a lower alkanoic acid, such as polyvinyl acetate or polyvinyl propionate. This polyvinyl ester is dissolved in methanol and alcoholized by slowly mixing with a dilute solution of potassium hydroxide in methanol to obtain a slurry of insoluble polyvinyl alcohol in methanol and methyl acetate. All of the methanol and methyl acetate then are removed by distillation under vacuum while constantly replacing the same with the solvent to be used during the subsequent hydroxyalkylation, such as dioxane, pentanol-3, or the equivalent. It is advantageous to add a small amount of a lower alkoxyisopropanol such as methoxyisopropanol, to facilitate the distribution of the subsequently added catalyst.

An aqueous or alcoholic solution of the catalyst then is slowly added and intimately mixed with the polyvinyl alcohol slurry prior to the hydroxyalkylation step. When a primary alcohol is added with the catalyst it is subsequently distilled out before adding the alkylene oxide.

Polyvinyl alcohols of medium and those of high average molecular weights are especially useful in the process. Examples thereof are polyvinyl alcohols having molecular weights such that 4% solutions thereof in water at 20° C. have absolute viscosities within the range between 4 and 45 centipoises, and even higher.

In the hydroxyalkylation step, according to one preferred modification of the invention, a methanol solution of caustic soda is mixed with the polyvinyl alcohol slurry, and the methanol is removed by distillation. Liquid ethylene oxide then is added and reacted with refluxing at temperatures ranging from 20° C. to about 35° C. until substantially all of the ethylene oxide has reacted. When propylene oxide is used, the final temperature preferably is about 45° C. Any unreacted alkylene oxide is removed by vacuum distillation, the catalyst is neutralized with an acid such as hydrochloric or acetic acid, and the neutralized product is distilled under a vacuum at kettle temperatures not exceeding 100° C. to remove the solvent and any water present. The salt formed by the neutralization can be removed in a well-known manner as hereinafter disclosed prior to the distillation.

In another form of the invention an aqueous solution of caustic soda is added slowly to the polyvinyl alcohol slurry containing a liquid which is a solvent for the hydroxyalkylated product, after which the alkylene oxide reaction is conducted in the general manner described.

The hydroxyalkylated polyvinyl alcohols of high average molecular weight of this invention are soluble in such organic solvents as acetone, methyl isobutyl ketone and other aliphatic ketones having up to 5 carbon atoms, dioxane, dimethylformamide, acetonitrile, and the lower alkyl diethers of ethylene glycol and the polyethylene glycols, such as the dimethyl and diethyl ethers of ethylene glycol and of diethylene glycol. However, only these products formed by reacting ethylene oxide and the polyvinyl alcohol in the weight ratios of at least 8 to 1 possess satisfactory solubility in acetone; whereas solubility of the hydroxyalkylated polyvinyl alcohols in dioxane begins when about 4 to 5 parts by weight of ethylene oxide has reacted with one part of the polyvinyl alcohol, and solubility of the products in acetonitrile begins when at least about 7 parts of ethylene oxide have reacted with each part by weight of the polyvinyl alcohol.

The ratio of alkylene oxide to polyvinyl alcohol, by weight, required to produce hydroxyalkyl polyvinyl alcohols soluble in these organic solvents increases with the average molecular weight of the polyvinyl alcohol starting material. There appears to be no upper limits to the ethylene oxide content of these products at which their solubility in dioxane and in acetone is lost. However, their solubility in acetonitrile appears to decline in those products made by reacting around 15 parts or more of ethylene oxide per part of polyvinyl alcohol, by weight.

The following examples serve to illustrate the invention:

*Example 1*

A mixture of 98.6 grams of polyvinyl acetate, grade AYDW (equivalent to 50.4 grams of polyvinyl alcohol), was alcoholized in 818.2 grams of methanol and 2.5 grams of caustic potash by adding a methanol solution of the polyvinyl acetate to a solution of the caustic potash in methanol during four hours. The resultant finely divided dispersion of polyvinyl alcohol in methanol was distilled under vacuum to remove methanol and methyl acetate while maintaining the volume of kettle residue uniform by continuous addition of dioxane. Then 72.6 grams of methoxyisopropanol were added, the reaction flask was purged with nitrogen, and 34 grams of a 22% aqueous solution of caustic soda were added dropwise to the agitated reaction mixture at a temperature of 6°–16° C. during one hour. Then 604.7 grams of liquid ethylene oxide were added at 2°–3° C. and the reaction conducted at temperatures ranging from 3° to 23° C. during 31 hours. Then 299.7 grams of chilled ethylene oxide were added, and the reaction continued for 120 hours at temperatures of from 23° to 33.6° C. When refluxing of ethylene oxide had ceased, the reaction mixture was distilled under vacuum to remove residual ethylene oxide, recovering 25.7 grams thereof; the distillation residue was neutralized with concentrated aqueous hydrochloric acid and glacial acetic acid. The neutralized residue was distilled to a kettle temperature of 88° C. under 1–9 mm. of mercury pressure. The residue was decanted from the precipitated salt and dried to constant weight at 64° C., yielding 871.7 grams of hydroxyethyl polyvinyl alcohol in the form of a very viscous, amber liquid that was soluble in water, dioxane, acetonitrile and acetone, respectively. A 0.2% aqueous solution thereof had a specific viscosity at 20° C. of 0.109; and a 0.2% solution thereof in acetonitrile had a specific viscosity at 20° C. of 0.132. The product contained ethylene oxide and polyvinyl alcohol equivalents in the weight ratio of 17.4 to 1.

*Example 2*

A mixture of 100 grams of polyvinyl acetate, grade AYAX (equivalent to 51.2 grams of polyvinyl alcohol), was alcoholized in 376 grams of methanol in which 2.5 grams of potassium hydroxide was dissolved, and the methanol and methyl acetate were eliminated by distillation at 11° C. under a pressure of 7 mm. of mercury, constantly replacing the distilled portion with dioxane. A solution of 6 grams of metallic sodium in 125.5 grams of methanol then was added to the reaction mixture and the methanol was removed by distillation at 11°–12° C. under 20 mm. of mercury pressure. The vessel then was flushed with nitrogen, and 606.3 grams of chilled ethylene oxide were added at a temperature of 2°–3° C. and the temperature was gradually raised to 36.9° C. during 114 hours. When refluxing of ethylene oxide had ceased the mixture was distilled at 10°–19° C. under 4 mm. of mercury pressure to remove any unreacted ethylene oxide, after which the mixture was neutralized with concentrated aqueous hydrochloric acid and acetic acid. A total of 34.7 grams of ethylene oxide was recovered. The neutralized mixture was distilled to a maximum temperature of 91° C. under from 0.5 to 7 mm. of mercury pressure. The residue, a viscous amber-colored liquid was allowed to settle, was separated from the salt by decantation, dried at 64°–65° C., and gave a 93.3% yield of hydroxyethyl polyvinyl alcohol at an efficiency of 99%. A 0.2% aqueous solution thereof had a specific viscosity at 20° C. of 0.066. Under similar conditions a 0.2% solution thereof in acetonitrile had a specific viscosity of 0.084. The product was soluble in water, acetone, acetonitrile and dioxane. It contained ethylene oxide and polyvinyl alcohol residues in the weight ratio of about 11.1 to 1.

In this example anhydrous conditions were maintained as nearly as possible, and sodium methylate was used as catalyst.

*Example 3*

In the general manner described in Example 1, 99.9 grams of polyvinyl acetate, grade AYAX (corresponding to 51 grams of polyvinyl alcohol), was alcoholized in 375.7 grams of methanol and 240.7 grams of a methanol solution containing 2.5 grams of caustic potash, and the reaction mixture was distilled under vacuum to remove methanol and methyl acetate, while maintaining a constant liquid level with dioxane. The reaction vessel and contents were purged with nitrogen, and 7.5 grams of powdered caustic soda, dissolved in 151 grams of methanol, were added with agitation at a temperature of 1° C. The methanol was distilled off at 10°–25° C. under a pressure of 12 mm. of mercury, the reaction mixture was cooled to 6° C., again purged with nitrogen, and 602 grams of chilled 98.5% ethylene oxide were added and the temperature gradually raised from 21° C. to 35° C. during 194 hours. The reaction mixture then was distilled at 12° to 36° C. under 10 mm. of mercury pressure, 58.6 grams of ethylene oxide being recovered. The still residue was neutralized with hydrochloric acid and glacial acetic acid and thereafter distilled to a kettle temperature of 86° C. under 1 mm. of mercury pressure. The residue was allowed to settle and, after decanting the product from precipitated salts, and drying to constant weight at 64° C. gave a yield of 82.6% of the hydroxyethyl polyvinyl alcohol, based upon the combined weight of ethylene oxide and polyvinyl alcohol, at an efficiency of 91.6%. This product was an amber-colored, viscous liquid that was completely soluble in water, dioxane, acetonitrile and acetone, respectively. Measured at 20° C., 0.2% solutions of this product had the following specific viscosities:

| Solvent | Specific Viscosity |
|---|---|
| water | 0.114 |
| acetonitrile | 0.086 |

*Example 4*

A mixture of 99.5 grams of polyvinyl acetate, grade AYAX (equivalent to 50.95 grams of polyvinyl alcohol), in a solution of 2.5 grams of caustic potash in 612.6 grams of methanol was alcoholized in the general manner described in Example 1. When alcoholysis was complete the methanol and methyl acetate were removed by distillation at 18°–24° C. under 11–20 mm. of mercury pressure during which the liquid level in the still was maintained by the constant addition of dioxane. Then 15.7 grams of caustic soda pellets dissolved in 273.5 grams of methanol were intimately mixed with the reaction mixture at 5° C. while flushing the reaction vessel with nitrogen. After removing the methanol and methyl acetate by distillation at 12°–20° C., under 20 mm. of mercury pressure and again flushing the reaction vessel with nitrogen, and cooling to 6° C., 790.4 grams of propylene oxide were added with agitation and the reaction continued for 160 hours at a maximum temperature of 45° C. The reaction mixture then was distilled up to a temperature of 88° C. under a pressure of 1 to 4 mm. of mercury, recovering 66.6 grams of propylene oxide in the distillate. The residue was allowed to settle, and the hydroxypropyl polyvinyl alcohol was separated from the precipitated salt by decantation and dried at 64°–65° C. to constant weight. The dried product was obtained in the form of an amber-colored viscous liquid that was completely soluble in water, acetone, dioxane, and acetonitrile, respectively. Solutions of 0.2% by weight of the product in the following solvents had the viscosities indicated, at 20° C.:

| Solvent | Specific Viscosity |
|---|---|
| water | 0.041 |
| acetonitrile | 0.024 |

The product contained propylene oxide and polyvinyl alcohol equivalents in the weight ratio of about 14.2 to 1.

*Example 5*

A mixture of 100 grams of polyvinyl acetate, grade AYAX, having a Ford cup viscosity of 52 to 62 seconds at 25° C. (equivalent to 51.2 grams of polyvinyl alcohol), was alcoholized in a solution of 2.5 grams of caustic potash in 625 grams of methanol, by heating at about 39° C. for 4.5 hours.

The methanol and methyl acetate then were removed by distillation at 5° C. under 4 to 20 mm. of mercury pressure, while constantly replacing with dioxane the vapors removed. Then additional dioxane was added to bring the total dioxane content to 620 grams, and 82.3 grams of methoxyisopropanol were added with continuous agitation while flushing the reaction vessel and contents with nitrogen. Concurrently, 67.2 grams of 22% aqueous caustic soda solution were added dropwise to the mixture held at 1° to 3° C. Then about 230 grams of chilled 99.3% ethylene oxide were added during 10 minutes at a temperature of —3° C., whereupon the mixture was heated to 30° C. and refluxing continued for 11 hours. Then 231.5 grams of ethylene oxide were added and refluxing resumed at temperatures of from 22° to 35° C. during 37 hours. The reaction mixture was cooled, neutralized with aqueous hydrochloric acid and acetic acid, and thereafter the dioxane, water, methoxyisopropanol and residual ethylene oxide were removed by distillation to a kettle temperature of 90° C. under 4 mm. of mercury pressure recovering 23.3 grams of ethylene oxide. The residual hydroxyethyl polyvinyl alcohol was recovered by dissolving the reaction mixture in acetone, thereafter the salt settled out, and the acetone solution was dried at 64° C. The dried product, which contained ethylene oxide and polyvinyl alcohol equivalents in the weight ratio of about 8.6 to 1, was an amber-colored, viscous liquid that was completely soluble in water, dioxane, acetone and acetonitrile, respectively. 0.2% solutions of the product in water and in acetonitrile had the following specific viscosities at 20° C.:

| Solvent | Specific Viscosity |
|---|---|
| water | 0.067 |
| acetonitrile | 0.041 |

*Example 6*

In a closed Read mixer, 400 grams of a commercial polyvinyl alcohol recited in Example 5 and containing 96.5% of total solids were mixed with 600.5 grams of an approximate 22% aqueous solution of caustic soda. Then the mixer was evacuated to a pressure of 27″ of water and a nitrogen atmosphere was imposed upon the mixture. Then during 140 hours, while maintaining the mixture at temperatures ranging from 17° C. to 34.5° C., under pressures ranging from 0 to 27 inches of water, ethylene oxide was added in successive portions until 3,615 grams of ethylene oxide had reacted. The resultant viscous liquid was filtered. The filtrate upon analysis contained 72.5% of hydroxyethyl polyvinyl alcohol and 2.5% of caustic soda. Upon neutralizing the filtrate with aqueous hydrochloric acid and acetic acid and dehydrating the same by azeotropic distillation with isopropyl ether, the residual hydroxyethyl polyvinyl alcohol was completely soluble in acetone, water, dioxane and acetonitrile, respectively. The product contained ethylene oxide and polyvinyl alcohol residues in the weight ratio of about 9 to 1. A 0.2% aqueous solution thereof had a specific viscosity at 20° C. of 0.036.

The Ford cup viscosities mentioned herein are the viscosities, in seconds, of a 20% solution of the resin in acetone at 25° C., with a Ford cup having a No. 4 tip.

The polyvinyl alcohol, grades AYDW and AYAX, respectively recited in the examples, had average molecular weights such that the absolute viscosities at 20° C of solutions of 8.602 grams of the material in 100 cc. of benzene were 125 centipoises and 30 centipoises, respectively.

The specific viscosities of the hydroxyalkyl polyvinyl alcohols referred to herein are determined at 20° C. using an Oswald viscosimeter, in accordance with the formula $$\text{Sp. vis.} = \frac{\text{Viscosity of a solution of 0.2 gram of the product in 50 cc. of the solvent}}{\text{Viscosity of the solvent}} - 1$$

The invention is susceptible of modifications within the scope of the appended claims.

I claim:

1. Process for making water-soluble hydroxyalkyl ethers of polyvinyl alcohols which are soluble in dioxane, which comprises reacting at temperatures within the range between about 10° C. and about 45° C. an alkylene oxide having 2 to 3 carbon atoms with a polyvinyl alcohol in the ratio of at least about 4 parts by weight of the alkylene oxide per part by weight of the polyvinyl alcohol, while dispersed in a volatile organic liquid which is a solvent for the resultant hydroxyalkylated product, in the presence of an inorganic alkaline condensation catalyst, neutralizing the resultant reaction mixture, and recovering therefrom the hydroxyalkyl polyvinyl alcohol.

2. Process for making water-soluble hydroxyalkyl ethers of polyvinyl alcohols which are soluble in dioxane, which comprises reacting at a temperature within the range between about 10° C. and about 45° C., in the presence of an inorganic alkaline condensation catalyst, at least about 4 parts by weight of an alkylene oxide having 2 to 3 carbon atoms, with one part by weight of an at least 98% hydrolyzed polyvinyl ester of a lower alkanoic acid in a volatile organic dispersant which is a solvent for the resultant hydroxyalkyl polyvinyl alcohol product, said ester being substantially free from lower alkanols and lower alkyl esters of lower alkanoic acids, neutralizing the resultant reaction mixture, and recovering therefrom the hydroxyalkyl polyvinyl alcohol.

3. Process for making highly hydroxyalkylated ethers of polyvinyl alcohols which ethers are soluble in acetone and in acetonitrile, which comprises reacting at a temperature within the range from about 10° C. and about 45° C., in the presence of an inorganic alkaline condensation catalyst, at least about 8 parts by weight of an alkylene oxide having 2 to 3 carbon atoms with one part by weight of polyvinyl alcohol in a volatile organic dispersant for the reactants which is a solvent for the resultant highly hydroxyalkylated polyvinyl alcohol product, said polyvinyl alcohol being substantially free from lower alkanols and lower alkyl esters of lower alkanoic acids, neutralizing the resultant reaction mixture, and recovering therefrom the hydroxyalkyl polyvinyl alcohol product.

References Cited in the file of this patent

UNITED STATES PATENTS

| | | |
|---|---|---|
| 1,971,662 | Schmidt et al. | Aug. 28, 1934 |
| 2,103,000 | Reppe et al. | Dec. 28, 1937 |

FOREIGN PATENTS

| | | |
|---|---|---|
| 368,530 | Great Britain | Mar. 10, 1932 |
| 398,173 | Great Britain | Sept. 1, 1933 |
| 500,300 | Great Britain | Feb. 7, 1939 |

OTHER REFERENCES

Schildknecht: "Vinyl and Related Polymers" (1952), page 350, Table 5.